United States Patent [19]
Goodson et al.

[11] Patent Number: 5,776,243
[45] Date of Patent: Jul. 7, 1998

[54] PERMEABLE CELLULAR CONCRETE AND STRUCTURE

[75] Inventors: Russell L. Goodson, Denver; Gary J. Colaizzi, Lakewood; Brian Masloff, Westminster; Joseph J. Feiler, Colorado, all of Colo.

[73] Assignee: Goodson and Associates, Inc., Lakewood, Colo.

[21] Appl. No.: 792,981

[22] Filed: Feb. 3, 1997

[51] Int. Cl.$^6$ .................................................. C04B 38/10
[52] U.S. Cl. .................. 106/677; 106/679; 106/707; 106/708; 106/709; 106/724; 106/802; 405/36; 405/266; 405/267; 405/268
[58] Field of Search ................... 106/677, 679, 106/707, 708, 709, 724, 802; 405/266, 267, 268, 36

[56] References Cited

U.S. PATENT DOCUMENTS

| | | | |
|---|---|---|---|
| 3,979,217 | 9/1976 | Sutton | 106/677 |
| 4,190,456 | 2/1980 | Absolon et al. | 106/99 |
| 4,419,135 | 12/1983 | Hoge | 106/88 |
| 4,464,200 | 8/1984 | Duval | 106/90 |
| 4,683,003 | 7/1987 | Nakano et al. | 106/677 |
| 4,965,097 | 10/1990 | Bach | 428/194 |
| 5,047,085 | 9/1991 | Hihara et al. | 106/677 |
| 5,063,967 | 11/1991 | Stephens | 138/98 |
| 5,087,287 | 2/1992 | Hihara et al. | 106/677 |
| 5,091,014 | 2/1992 | Hihara et al. | 106/677 |
| 5,110,839 | 5/1992 | Chao | 521/83 |
| 5,183,505 | 2/1993 | Spinney | 106/677 |
| 5,482,550 | 1/1996 | Strait | 106/677 |

FOREIGN PATENT DOCUMENTS

| | | | |
|---|---|---|---|
| 2570072 | 3/1986 | France | 106/677 |
| 61-097179 | 5/1986 | Japan | 106/677 |

OTHER PUBLICATIONS

WPIDS Abstract No. 77–13826Y, which is an abstract of Japanese Patent Specification No. 52–004531 (Jan. 1977).
WPIDS Abstract No. 90–206233, which is an abstract of Japanese Patent Specification No. 02–137781 (May, 1990).

*Primary Examiner*—Anthony Green
*Attorney, Agent, or Firm*—Kyle W. Rost

[57] ABSTRACT

A cellular drainage structure is formed of a predetermined volume of a settable, water permeable, cellular concrete product. A concrete mix is formed of a uniformly graded aggregate in the size range from 1/16 inch to two inches and in a quantity corresponding to the predetermined volume; a cementitious component in the quantity range from 141 to 658 pounds per cubic yard of product; water in quantity sufficient to create a water-to-cement ratio in the approximate range from 0.30 to 0.55 and sufficient to wet the aggregate, establishing a cementitious-component-and-water matrix of determinable volume; a pre-formed surfactant foam, generated from an aqueous surfactant mixture at a dilution of from approximately 3 to 25 grams per liter of surfactant in water, wherein the pre-formed foam is in the density range of from 2.0 to 3.0 pcf, and the foam is added in the quantity range of 5% to 30% of the volume of the cementitious-component-and-water matrix. Finally, the mix includes an aqueous flocculent solution at a dilution of from five to thirty grams per liter of water and added to the mix in the quantity range of 54 to 2,394 grams per cubic yard of product.

18 Claims, 2 Drawing Sheets

FLOCCULENT QUANTITY
vs Cement Content & W/C Ratio 5,776,243

PERMEABLE CELLULAR CONCRETE AND STRUCTURE

TECHNICAL FIELD

The invention generally relates to hydraulic and earth engineering, especially to permeable cellular concrete material and structures made thereof. More specifically, it relates to cementitious chemicals applied by mixing and placement. Another aspect of the invention relates to coating or plastic compositions, especially those containing an inorganic settable ingredient such as cement. A further aspect of the invention generally relates to cellular products in the area of synthetic resins, especially to cellular products or processes of preparing a cellular product.

BACKGROUND ART

Water permeable structures often consist of loose materials such as beds of sand or gravel, which may be retained by a supporting device such as a grate or screen. Poured or pre-cast load bearing structures, such as concrete retaining walls, can be provided with a weep hole to relieve hydraulic pressure, but the cementitious material of such structures itself is non-permeable. When a loose material forms a permeable structure, the supporting grate or screen is likely to require a foundation and peripheral bracing, as well. Thus, retaining walls and drains can be costly and complex to construct. It has not been possible to form a high strength, load bearing, water permeable structure merely by pouring a plastic, settable composition.

Traditional base course systems for heavy highway construction consist of specific aggregate gradations, highly compacted, to obtain stability and provide a supporting foundation for the overlying pavement. Highways often are constructed, out of necessity, over poor subgrade soils such as swelling clays. When subjected to wet and dry cycles, these subgrade soils become susceptible to movement from expansion and contraction, resulting in subsequent loss of support and pavement faulting damage. Traditional base courses are permeable but slow draining and often do not drain water away from poor subgrade soils rapidly enough.

Recently, various governmental agencies have experimented with cement-treated permeable bases (CTPBS) to provide drainable pavement systems for roadway construction. These CTPBs consist of formulations of gap-graded aggregate and cement, and are placed in lieu of traditional road bases as a stable, highly permeable base for paving over areas that are prone to pavement damage due to poor subgrade soils. CTPBs rapidly funnel water from underneath pavement, usually into an edge-drain constructed with perforated pipe in a trench running parallel to the highway.

CTPBs are characterized by a thin cement coating covering each piece of aggregate. The thin coating is subject to rapid drying in the presence of high ambient temperatures, sun, wind, and low humidity. Rapid drying causes strength loss, spalling and eventual decomposition of the material. The thin coating is susceptible to freeze-thaw damage, which can result in failure of the material. Demonstrations of CTPBs have included curing procedures lasting several days and consisting of frequent water spraying or covering with plastic sheeting to prevent rapid drying. Other reported problems with CTPBs include segregation of the cement paste from the aggregate, caused by high water-to-cement ratios that sometimes are used to facilitate the workability of the mixture during placement. All of these problems show the need for an improved material suited for use in CTPBs.

Retaining walls and terrace walls are common where development and landscaping takes place in hilly and sloping areas. Especially popular are walls formed of natural stone, fitted and placed by hand. While such walls are aesthetically appealing, their construction is time consuming and labor intensive, causing them to be expensive. By contrast, concrete walls are easily formed and poured in-place, making them less costly and more efficient to construct, but lacking in aesthetic appeal. It would be desirable to have an aesthetically more pleasing type of concrete wall, in order to bring the construction efficiency and cost savings of concrete walls to the retaining wall market.

Natural rock walls often are dry-laid, without mortar to hold the individual stones in place. Concrete mortar usually is objectionable since much of the aesthetic appeal is lost, and the mortar tends to facilitate the build-up of hydraulic pressures that can cause damage or failure. Often, the in-situ soil is used to fill spaces between the rocks. However, the soil is subject to wash-out during heavy precipitation events. Construction of natural rock walls usually involves placement of selected large rocks at the bottom, to form a broad cross section that tapers towards the top of the wall. This shape provides a firm foundation and resistance to tipping. It would be desirable to have a permeable backing for natural rock walls to allow water to drain, effectively eliminating hydraulic pressures. Similarly, with a suitable backing the dry-laid wall can achieve the structural support of a broad cross section while permitting use of smaller natural stones.

Drainage structures, such as drop structures, are used to dissipate storm water energy and preserve drainage channels by preventing erosion. Typically, they are constructed of reinforced concrete extending well below grade and lacking any natural appeal. It would be desirable to use more appealing natural stone or other more attractive structures, if such stone or structures could be used without likelihood of failure under hydraulic pressures during heavy run-off conditions.

Bridge supports often face the problem of hydraulic scour, which occurs when a flow of flood stage water is interrupted or diverted by bridge piers or abutments. The water flow is deflected down the side of the obstruction, forming a vortex, which erodes a large pit in the stream bed material surrounding the pier. When enough of the supporting soil material is eroded from the footing, the result is pier failure and subsequent bridge damage or failure. Hundreds of bridges throughout the United States were jeopardized by the action of hydraulic bridge pier scour during the widespread flooding of the summer of 1993. Specially shaped interlocking blocks have been tested as a means of preventing hydraulic scour, but the cost is high. It would be desirable to have an efficient material or structure that is more easily placed and that could dissipate or diffuse the energy of the vortex and retain the underlying soil materials.

A problem similar to hydraulic scour is the action of waves along coastlines. High water waves erode beach sand and destroy the recreational potential of these areas. Similarly, along waterways such as rivers and other drainages, bank and slope erosion occurs during heavy or critical runoff. It would be desirable to have a material or structure that can mitigate the effects of erosion caused by high water, waves, and heavy runoff.

Both commercial and residential construction include large areas of concrete flatwork. Concrete is used to construct both functional and attractive landscape features, such as patios, pathways between buildings, and driveways for residences. While normal concrete is very durable and functional, typically it is not very attractive and increases runoff to adjacent areas. Specialized finishes have been used, such as pattern stamping and coloring, but these are very expensive and can be cost prohibitive. It would be desirable to have a much more inexpensive alternative to normal concrete, that is easily placed, naturally more attractive, and capable of draining. Further, a durable, highly drainable material could be used for entirely new purposes such as greenhouse flooring.

Various patents have proposed cementitious structures that are useful in water and earth management. For example, U.S. Pat. No. 4,419,135 to Hoge discloses a foamed, cellular cement containing a superplasticizer, which is suitable for sealing tunnels and back filling. However, the cementitious product is solid and acts as a water impermeable seal.

U.S. Pat. No. 4,190,456 to Absolon et al. employs a combination of portland cement, aggregate, surfactant and flocculent in preparing a cementitious composition of asbestos fibers in a dust free, safer manner.

U.S. Pat. No. 4,464,200 to Duval discloses a cement for stabilizing clay soil. The formula employs portland cement, a filler such as fly ash, and a retarding agent for the purpose of treating plastic soils with cement to make the soils more friable and increase their load bearing capacity.

U.S. Pat. No. 5,063,967 to Stephens discloses the use of portland cement to form a low density foamed concrete. This material serves as a pumpable grout suited to fill clearances between plastic sewer liners and outer pipe, or between bridge cable covers and the cable. The grout is intended to prevent water damage and, thus, is water resistant.

U.S. Pat. No. 5,110,839 to Chao teaches a stabilized foam with fine pore sizes. This foam is used in light weight, cellular, cementitious products, especially building materials and structures where soundproofing, fire resistance, and decreased water permeability are desired.

U.S. Pat. No. 4,965,097 to Bach discloses an earth confinement material that employs plastic, texturized strips to form air cells that hold fill material, such as of cement and aggregate.

It is evident that typical cementitious materials are not permeable to water or are of low permeability. While cementitious materials can be suited for load bearing uses, it would be desirable to create a cementitious composition that is permeable, as well.

Further, it would be desirable to have a cementitious composition that both forms a permeable structure and can be poured without forms, at a high angle of repose, such as 70°.

To achieve the foregoing and other objects and in accordance with the purpose of the present invention, as embodied and broadly described herein, the product and method of application of this invention may comprise the following.

DISCLOSURE OF INVENTION

Against the described background, it is therefore a general object of the invention to provide a permeable cellular concrete material that can be load bearing.

Another object is to provide a cementitious material that can be poured in place without requiring forms, to an angle of repose of up to 70°.

A related object is to provide a cementitious material that is easily placed, aesthetically pleasing, colorable, and thus well-suited for use in constructing landscape walls.

Still another object is to provide a cementitious mixture suitable to form a permeable concrete that can be poured at high ambient temperatures with no adverse effects.

An important object is to provide a mix formulation for a free draining, cementitious structure that is highly weather resistant.

A further object is to create a cementitious mix formulation suitable to form a permeable concrete that is resistant to freeze-thaw cycles.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, a permeable cellular concrete composition is suited, upon setting, to form a cellular drainage structure. The composition is formed of a cementitious component in the quantity range from 141 to 658 pounds per cubic yard of product. A uniformly graded aggregate component is in the size range from $\frac{1}{16}$ to two inches and is characterized by the substantial absence of fines. The quantity of aggregate is the desired volume of the end product, since the other components do not increase the volume in this mix. Water is added in quantity sufficient to create a water-to-cement ratio in the approximate range from 0.30 to 0.55 and sufficient to wet the aggregate. A surfactant is used in quantity range of from approximately 3 to 40 grams per liter dilution in water. Prior to mixing, the diluted surfactant is formed into a foam having a foam density ranging from 2.0 to 3.0 pounds per cubic foot, and the foam is mixed with the cement component, water, and aggregate in quantity of from 5%–30% of the volume of the cement-and-water matrix. Finally, a flocculent is diluted in water in a quantity of from one to about thirty grams per liter, and is added to the mixture in quantity between 54 and 2394 grams per cubic yard of product. The dilution rate is dependent upon the molecular weight of the flocculent.

According to another aspect of the invention, a method of forming a permeable concrete drainage structure employs the steps of providing a product by mixing together the combination of a cementitious component in the quantity range from 141 to 658 pounds per cubic yard of product; a substantially uniformly graded aggregate ranging in size from $\frac{1}{16}$ inch to two inches in quantity corresponding to the desired end volume of product; and water in a water-to-cement ratio of about 0.30 to 0.55 and in quantity sufficient to disperse the cement component and to achieve a smooth coating of the aggregate. To this mixture is added a foam formed of a surfactant and water, in a quantity of between 5% and 30% of the volume of the cementitious-component-and-water matrix. The foam has a foam density of 2.0 to 3.0 pounds per cubic foot. Further, a flocculent, polymer, or both, is added to the mixture in quantity range from 54 to 2,394 grams per cubic yard of product, thereby forming the product. Finally, the product is placed in location to set, forming the cellular drainage structure.

The accompanying drawings, which are incorporated in and form a part of the specification illustrate preferred embodiments of the present invention, and together with the description, serve to explain the principles of the invention. In the drawings:

BEST MODE FOR CARRYING OUT THE INVENTION

One aspect of this invention is a mix formulation that forms a durable, highly permeable cellular concrete. Another aspect is permeable structures formed from such a mix formulation. Such a durable, permeable concrete allows the construction of numerous structures that presently are not known or that require substantial improvement.

The mix is an aqueous formulation containing a cementitious component, such as portland cement, in the quantity range from 141 to 658 pounds (1.5 to seven sacks) per cubic yard of product. The cementitious component most often is portland cement. However, depending upon availability, a portion of the cementitious component could be made up of class C fly ash, kiln dust, or other pozzolan. The term "cement" will be used in the general sense to refer to the cementitious component, which may or may not include pozzolan other than portland cement.

Figure 2:
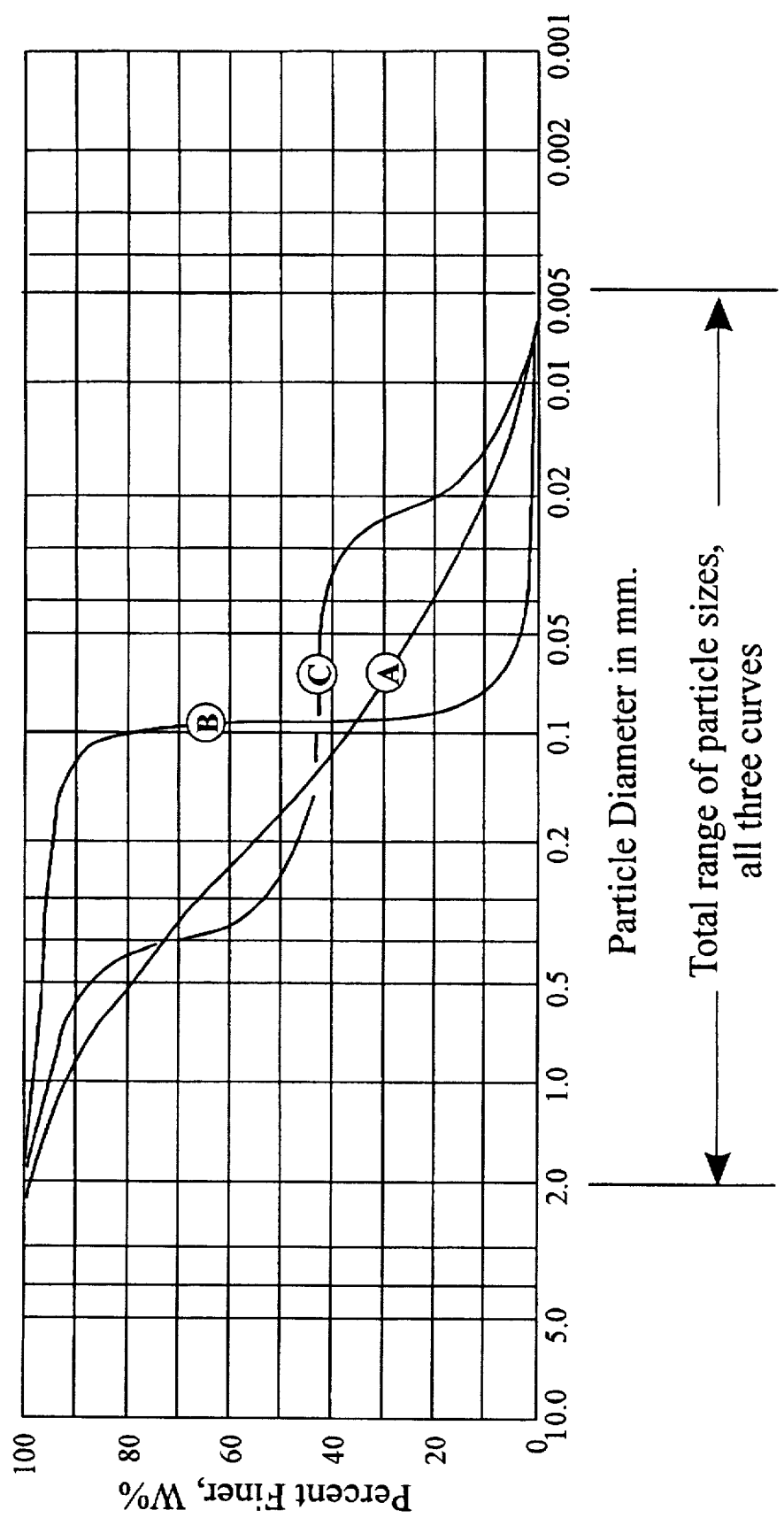
FIG. 2 is a graph showing typical composition of uniformly graded aggregate and comparing it to other gradations.

To the cementitious component is added a predetermined volume of aggregate in the size range from 1/16 inch to two inches, characterized by the substantial absence of fines, and such that a system of interconnected voids is created throughout the aggregate mass. The aggregate should be uniformly graded, such that the aggregate consists of predominately particles of a single size and such that it contains insufficient fines to fill the voids between the larger particles. In FIG. 2, Curve B shows the desired particle distribution of a uniformly graded aggregate. In contrast, Curve A represents a material with an even distribution of sizes, while Curve C represents a skip graded or gap graded aggregate, which is predominately fine material with some large chunks. Aggregate shape can be angular, such as from crushing, or rounded, such as from sedimentary deposits like gravel. The quantity of aggregate is the volume required to occupy the desired volume of the end product, since the other components of the mix do not increase the volume of the product.

Water is added in quantity sufficient to create a water-to-cement (w/c) ratio in the approximate range from 0.30 to 0.55 and sufficient to wet the aggregate. The content of water is determined by the w/c ratio. In addition, the water and cement, or cementitious component, establish a cement-and-water matrix whose volume is determinable as explained below.

To this mixture is added pregenerated foam in a content ranging between 5% and 30% of the volume of the cement-and-water matrix. The foam is formed of a surfactant diluted in water. Different foaming agents are known, such as those marketed by Merle Corporation and Cellufoam Concrete Systems. These vary in desired concentration according to the efficiency of each and the method used to generate the foam. Two methods commonly used for generating foam are passing compressed air through the solution and using a pump that mechanically mixes air with the solution. For example, one type of foam concentrate surfactant requires a dilution rate of about 6 grams/liter in a compressed air system, while requiring a dilution rate of about 18 grams/liter in a mechanical generating system. The product foam from either system of the example has a correct bubble structure and density of about 2.4 pounds/ft$^3$ (pcf). For purposes of this invention, the typical surfactant dilution is in a quantity range of from approximately 3 to 40 grams per liter dilution in water, with the preferred dilution range being from 3 to 25 grams per liter dilution. Prior to mixing, the diluted surfactant is formed into the foam, which typically has a foam density in the range from approximately 2.0 to 3.0 pcf, and a preferred foam density from 2.2 to 2.6 pcf. The foam is mixed with the cement component, water, and aggregate.

A further component is an aqueous solution of flocculent. Typical dilution rate is from one to thirty grams per liter or warm water. A high molecular weight, low charge, cationic flocculent is the type used in the invention. With a molecular weight of 9,000,000 for the polymeric concentrate, a dilution rate of 20 grams per liter in water is preferred in most circumstances. However, the higher the molecular weight, the more susceptible is the flocculent to degradation by heat and shear, the latter being present in the drum of a transit mixer. If it is anticipated that the mixture of the product will have a mixing time exceeding 30 minutes in a drum mixer, or be subjected to temperatures above 100° F., then a dilution rate of 30 to 50 grams per liter in water would be used to maintain viscosity of the flocculent. The diluted flocculent is added to the cement, water, aggregate and foam mixture before it is placed to set. The preferred flocculent content range is from 54 to 2,394 grams, or 0.119 to 5.278 pounds, per cubic yard of product.

Another aspect of the invention is the method of forming cellular drainage structures, using the mix formulation. According to a first step of the method, the cementitious components, water, and aggregate are mixed in a drum type mixer or trommel. The water content is contingent on the ambient temperature and surface area of the dry ingredients, although sufficient water should be added to thoroughly disperse the cementitious portion of the mix to achieve a smooth coating of the aggregate used. Second, foam is added to the mixture in sufficient quantity to further create a void system within the cement matrix capable of preventing freeze-thaw damage at the aggregate contact points. The addition of the foam to the mixture facilitates resistance to weathering due to freeze-thaw cycles. Third, the flocculent formula is added to the drum mixture in a range from 54 to 2,394 grams per cubic yard of product, or as better shown on the graphs of FIG. 1. The flocculent will react with the cement, fly ash, pozzuolanic and water portions of the mix, making it extremely adherent, somewhat like rubber cement, and preventing separation of the cement component and the aggregate. As prepared, the mix is placed in location to set.

The cellular drainage structure prepared according to this method is composed of uniformly graded, solid aggregate and a cementitious compound, which forms smooth, interconnected pores, or channels, between individual pieces of the aggregate. When properly mixed, the cementitious compound provides a thin coating to the aggregate, securing the particles together with a strong bond. The aggregate specifically lacks fine particles such as sand that, combined with the cementitious compound, normally would fill the interstitial space between the particles. The combination of the large aggregate and the thin, cellular concrete material can be utilized to form structures, with or without forms, that will pass water throughout the mass.

The concrete structure formed by the mixture can be load bearing. It has inherent structural integrity resulting from the strong bond created by the cementitious portion of the mixture. In addition, the cementitious portion of the mix is extremely adherent, due to the action of the flocculent. The adherence allows the drainage structure to bond to external structures located adjacent to its placement. The uniformly sized coarse aggregate carries the cementitious portion of the mixture substantially as a coating, with the result that bonding is substantially in the area of contact points between the aggregate. Correspondingly, a network of interconnected pores or channels is formed throughout the drainage structure at interstices between aggregate, allowing water to flow or drain throughout the structure. The channels tend to be large, due to the large sizes of the aggregate; and they are smooth due to the cementitious coating that adheres to the aggregate. These pores or channels between the aggregate tend to resist clogging by fine particles, such as stream channel sediment, due to their relatively large, smooth nature.

Placing the mix to form a drainage structure often can be done without forms and at warm temperatures. The angle of repose can be adjusted by varying the amounts of the dilute flocculent formula. The mixture can be placed and stand at an angle of repose of up to 70° without forms. Also, the flocculent retains humidity in the mixture, allowing the structure to continue to cure at high ambient temperatures. For hydration of cement to occur, the relative humidity in the mix must remain at a minimum of 80%. The flocculent causes humidity to be retained in the mixture at greater than 80% for an extended time. This allows continuing development of bonding strength and placement at ambient temperatures of 100° F.

Many types of drainage structures can be formed with this mix. The highly permeable material allows free fluid movement throughout the structure. Because the structure is self-supporting, the mix combines drainage qualities and structural integrity in one unit. The smooth pores resist clogging by soil particles, facilitating free drainage of water, minimizing erosional soil loss and alleviating problems associated with hydrostatic pressures. Permeable road bases, drainage drop structures, and retaining walls are examples of suitable structures. In surface water or high water table conditions, the mix provides a free draining base where additional support or inherent structural characteristics are required. Another example is greenhouse flooring, where the mix can provide a durable, permeable flooring system for commercial applications requiring free draining characteristics.

CTPB road bases require substantial improvement for the reasons noted above. The drainage structure of the present invention provides a more durable road base that increases roadway life, reduces long-term maintenance and pavement repairs, and saves labor during the construction process. While existing CTPB road bases may employ similar aggregate and cement components, they lack the pregenerated foam and flocculent additives of the invention. When applied as a CTPB, the drainage structure of this invention offers the following improvements:

1. The foam imparts an air void structure to the cement matrix for resisting freeze-thaw damage where bonding and material strength occurs, at the contact points of the aggregate.

2. The flocculent retains moisture in the cement matrix, such that during curing the cement hydration is not interrupted and strength accumulation continues. It is anticipated that the curing procedures associated with other CTPBs can be eliminated, even in the presence of severe conditions such as hot sun, wind, and low humidity.

3. The flocculent increases the adherence of the cement matrix to the aggregate particles and minimizes segregation.

When employed in the retaining and terrace wall industry, the drainage structure of this invention provides a replacement for natural stone walls. The concrete component can be dyed using standard concrete industry pigments. The wall can be formed and poured into any desired shape, while eliminating the labor-intensive construction associated with building rock walls. The cost efficiency and ease of construction is comparable to concrete, although further cost savings results by elimination of the back half of the forms necessary with concrete. Only the exposed front face of the wall is formed. In addition, the wall formed according to the invention provides built-in relief for hydraulic pressure by allowing storm and groundwater to drain from the soil, rather than building up behind the wall.

The drainage structure also can be used as an invisible backing to a natural rock wall, rapidly draining water from behind the wall and effectively eliminating hydraulic pressures. Another improvement is that the concrete material of the drainage structure adheres to the backs of the freestanding natural stones to form a strong, massive unit. Since it is easily placed, the structure can be used to provide the desired structural support of the broad-base wall cross section, while the natural stones are placed as a veneer. In addition to streamlining the construction process by saving time and labor, the use of the drainage structure decreases the necessary quantity of the proper natural stone.

When applied to drop structures, the invention allows the use of attractive natural stones, backed by the a large mass of the drainage structure, which can dissipate hydraulic pressures and solidify the entire structure into a single mass that will withstand severe runoff events. In the alternative, the drainage structure can be used by itself, in place of natural stones or normal concrete. Similarly, the drainage structure can serve as a replacement for rip-rap; a filter layer under rip-rap, which also acts as an adhesive for the rip-rap to keep it in place; stream bank erosion control blanket where heavy to critical flows are anticipated; culvert output aprons; and erosion control protection on slopes of 1:1 or greater, where heavy runoff exists.

The drainage structure can be applied in several ways to prevent or mitigate hydraulic scour. It can be placed as a massive filter under rip-rap or concrete armor units when constructing a protective pad around bridge piers and abutments. The permeable structure would diffuse the energy of the vortex and allow water to pass through the permeable structure, while retaining the underlying soil materials. The material of the invention may be poured in place or preformed into massive blocks for subsequent placement.

Similarly, the material of the invention may be formed into revetment blocks and placed as an armoring layer to hold soils in place. Alternatively, the material can be poured in place to create a more massive unit. The porous structure of the permeable concrete serves to pass water and alleviate hydraulic pressure while disrupting erosional energy and maintaining soils in place.

The drainage structure forms a drainable flatwork suited for use as sidewalks, patios, driveways, and greenhouse flooring. Such flatwork would drain rather than puddle water.

The following examples illustrate the composition and unique utility of the product.

EXAMPLE 1

Aggregate Size Range
Squeegee. Size Range ¼ in. ×¹⁄₁₆ in.
Mix Design #1:

| | |
|---|---|
| 2,681.10 lbs. | squeegee |
| 376.00 lbs. | cement |
| 176.00 lbs. | water |

|  |  |
|---|---|
| 1.14 lbs. | foam |
| 2.85 lbs. | flocculent |
| 3,237.09 lbs. | Mix Weight Wet |

Yield=1 cubic yard.
Water-to-cement ratio=0.47

Foam content: represents 10% by volume of the cement/water matrix, where the foam density=2.4 pcf.

Flocculent content: represents the middle of the range for this mix design based on cement content and water-to-cement ratio. Ranges were determined experimentally in the laboratory for mixes at the ends of the stated ranges for cement and w/c ratios, and interpolated for intermediate mix designs. Flocculent is diluted at 20 grams/liter of water.

Characteristics: Higher compressive strength (approximately 1,500 psi at 28 days) lower permeability (approximately 15 gpm/ft$^2$), flatter and smoother surface.

Example application: Greenhouse floor or self draining paved walkway.

EXAMPLE 2

Aggregate Size Range
Nominal 2 Inch Crushed Rock
Mix Design #2:

|  |  |
|---|---|
| 2,521.80 lbs. | 2" crushed rock |
| 376.00 lbs. | cement |
| 176.00 lbs. | water |
| 1.14 lbs. | foam |
| 2.85 lbs. | flocculent |
| 3,077.79 lbs. | Mix Weight Wet |

Yield=1 cubic yard.
Water-to-cement ratio=0.47
Foam content: Same as Example 1.
Flocculent content: Same as Example 1.

Characteristics: Greatly increased permeability (approximately 200 gpm/ft$^2$), coarse texture, decreased compressive strength (approximately 1,000 psi at 28 days).

Example application: Retaining wall or draining drop structure composed of colored product to blend with natural surroundings. Use as a replacement for concrete, or other typical system. Eliminates high hydrostatic head.

EXAMPLE 3

Cement Content Range
One and a Half Sack Mix
Mix Design #3:

|  |  |
|---|---|
| 2,489.67 lbs. | ¾" crushed rock |
| 141.00 lbs. | cement |
| 53.60 lbs. | water |
| 0.38 lbs. | foam |
| 1.51 lbs. | flocculent |
| 2,686.16 lbs. | Mix Weight Wet |

Yield=1 cubic yard.
Water-to-cement ratio=0.40
Foam content: Same as Example 1.
Flocculent content: Same as Example 1.

Characteristics: Low compressive strength (approximately 300 psi at 28 days), relatively high permeability (approximately 150 gpm/ft$^2$), freeze/thaw resistant.

Example application: Permeable road base under concrete or asphaltic concrete pavement.

EXAMPLE 4

Cement Content Range
Seven Sack Mix
Mix Design #4:

|  |  |
|---|---|
| 2,489.67 lbs. | ¾" crushed rock |
| 658.00 lbs. | cement |
| 263.20 lbs. | water |
| 1.77 lbs. | foam |
| 3.28 lbs. | flocculent |
| 3,415.92 lbs. | Mix Weight Wet |

Yield=1 cubic yard.
Water-to-cement ratio=0.40
Foam content: Same as Example 1.
Flocculent content: Same as Example 1.

Characteristics: Higher compressive strength (approximately 1600 psi at 28 days), decreased permeability (approximately 55 gpm/f$^2$), freeze/thaw resistant.

Example application: Drainage structure.

EXAMPLE 5

Water-to-cement ratio
W/C Ratio=0.30
Mix Design #5:

|  |  |
|---|---|
| 2,489.67 lbs. | ¾" crushed rock |
| 200.00 lbs. | cement |
| 60.00 lbs. | water |
| 0.48 lbs. | foam |
| 0.84 lbs. | flocculent |
| 2,750.99 lbs. | Mix Weight Wet |

Yield=1 cubic yard.
Water-to-cement ratio=0.30
Foam content: Same as Example 1.
Flocculent content: Same as Example 1.

Characteristics: Fairly low compressive strength (approximately 400 psi at 28 days), relatively high permeability (approximately 150 gpm/ft$^2$), fairly stiff material with a high angle of repose.

Example application: Backing to a dry-laid rock wall that serves as a drainage drop structure, or a terrace retaining wall. Eliminates hydrostatic head that could cause failure of the wall, and bonds to the wall to form a massive singular unit. Could also be used as backing to a drop structure or terrace retaining wall formed of this material, colored and constructed with a coarser aggregate.

EXAMPLE 6

Water-to-cement ratio
W/C Ratio=0.55
Mix Design #6:

|  |  |
|---|---|
| 2,489.67 lbs. | ¾' crushed rock |
| 200.00 lbs. | cement |
| 110.00 lbs. | water |
| 0.67 lbs. | foam |

| | |
|---|---|
| 3.01 lbs. | flocculent |
| 2,803.35 lbs. | Mix Weight Wet |

Yield=1 cubic yard.
Water-to-cement ratio=0.55
Foam content: Same as Example 1.
Flocculent content: Same as Example 1.
Characteristics: Fairly low compressive strength (approximately 400 psi at 28 days), relatively high permeability (approximately 150 gpm/ft$^2$), lower angle of repose and improved workability more suitable for placement at high ambient temperatures.

Example application: Construction of permeable road base drainage system underlying concrete or asphaltic concrete. Possibly construction of a massive "filter" structure in the stream bed around bridge supports, to mitigate pier scour during high water events.

EXAMPLE 7

Foam Quantity Range
5% Foam Content
Mix Design #7:

| | |
|---|---|
| 2,521.87 lbs. | 2" crushed rock |
| 376.00 lbs. | cement |
| 176.00 lbs. | water |
| 0.57 lbs. | foam |
| 2.85 lbs. | flocculent |
| 3,077.29 lbs. | Mix Weight Wet |

Yield=1 cubic yard.
Water-to-cement ratio =0.47
Foam content: 5% by volume of the cement and water matrix, where the foam density=2.4 pcf.
Flocculent content: Same as Example 1.
Characteristics: Very high permeability (estimated at 200 to 250 gpm/ft$^2$), relatively high compressive strength (approx. 1000 psi at 28 days), relatively lower resistance to freeze/thaw conditions.

Example application: Retaining wall or drainage structure constructed for high permeability in an area where freezing conditions are not usually encountered.

EXAMPLE 8

Foam Quantity Range
30% Foam Content
Mix Design #8:

| | |
|---|---|
| 2,521.87 lbs. | 2" crushed rock |
| 376.00 lbs. | cement |
| 176.00 lbs. | water |
| 3.41 lbs. | foam |
| 2.85 lbs. | flocculent |
| 3,080.13 lbs. | Mix Weight Wet |

Yield=1 cubic yard.
Water-to-cement ratio=0.47
Foam content: 30% by volume of the cement and water matrix, where the foam density=2.4 pcf.
Flocculent content: Same as Example 1.
Characteristics: Decreased permeability compared to Example #7 (estimated at 140 to 200 gpm/ft$^2$), decreased strength compared with Example #7, high resistance to freeze/thaw degradation.

Example application: Retaining wall or drainage structure constructed for high permeability in an area where freezing conditions are a consideration.

Flocculent Quantity Range

Figure 1:
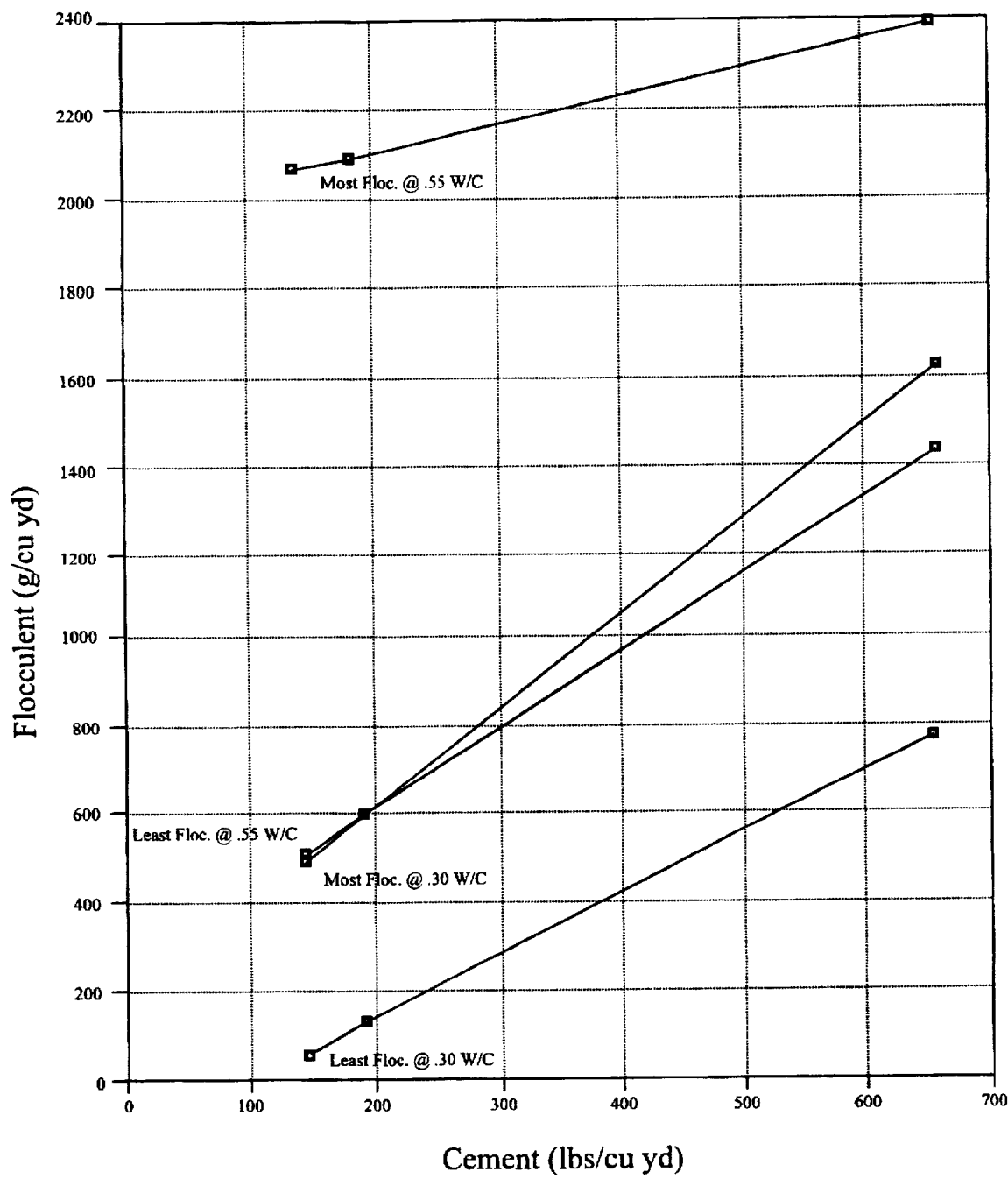
FIG. 1 is a graph showing Flocculent Quantity vs. Cement Content and W/C Ratio.

Flocculent quantity is dependent upon two other components of each mix design, the cement content and the water to cement ratio. Flocculent contents were determined experimentally, using laboratory quantity batches. The mixes used cement quantities and water-to-cement ratios at the extreme end of the stated ranges for these items, i.e.: cement=141 lbs to 658 lbs.; and w/c=0.30 to 0.55. The results are graphically illustrated on FIG. 1, showing "Flocculent Content vs. Cement and Water-to-Cement Ratio."

The lowest flocculent quantity used for a given cement content and w/c ratio is the amount where, by visual observation, a discernable change initially takes place in the consistency of the cementitious mixture. The upper limits of the flocculent range were determined by gradually adding flocculent to a batch and visually observing the point at which the addition of an incremental amount caused the cement matrix to collect or flocculate, such that the surfaces of the aggregate particles became exposed.

Flocculent quantity ranges for mix designs of intermediate cement contents and w/c rations can be interpolated from the graph. Factors affecting flocculent quantity within the ranges are related to the application and performance of the material, rather than the other components of the mix. For example, a larger amount of flocculent will cause the consistency of mixture to become stiffer, allowing it to be placed at a high angle of repose, for example, behind a dry laid natural rock wall. Conversely, a mix that is more workable, in terms of having the ability to be finished, may be desired for placement as a drainable road base system. In the latter case, the mix may be adjusted by adding less flocculent.

Another example illustrating flocculent quantity adjustment to alter mix performance is for placement on a hot day for constructing a permeable or drainable road base system for a highway. It would be important that the material not dry or cure too quickly, so that the desired compressive strength is achieved. The effect of the flocculent is to hold moisture in the cement matrix, with the result that hydration and corresponding strength accumulation are completed.

The mix may be placed under flowing water, such as in a stream bed at the base of a bridge pier. The resulting permeable structure forms a massive filter that prevents loss of stream bed material due to hydraulic scouring at the base of the bridge support, which otherwise might cause the support to fail. For this purpose, the mix design would contain a larger quantity of flocculent to create a very sticky cement matrix that tends to maintain adherence to the aggregate, allowing the material to achieve a set.

EXAMPLE 9

Flocculent Quantity Range
Low Quantity Flocculent
Mix Design #9:

| | |
|---|---|
| 2,489.67 lbs. | ¾" crushed rock |
| 188.00 lbs. | cement |
| 75.20 lbs. | water |
| 1.04 lbs. | foam |
| 0.69 lbs. | flocculent |
| 2,754.40 lbs. | Mix Weight Wet |

Yield=1 cubic yard.
Water-to-cement ratio=0.40

Foam content: 20% by volume of the cement and water matrix, where the foam density=2.4 pcf.

Flocculent content: Represents the lowest end of the range for this cement content and water-to-cement ratio.

Characteristics: Relatively low compressive strength (approx. 350 psi at 28 days); relatively high permeability (approx. 100 to 150 gpm/ft$^2$); a workable material that would be easily spread as a slab or molded in a form; durable and weather resistant when cured; relatively lower resistance to fast drying.

Example application: As a permeable road base material designed for cost efficiency, low construction traffic, workability, and placement at ambient conditions that do not warrant concern for fast drying.

EXAMPLE 10

Flocculent Quantity Range
High Quantity Flocculent
Mix Design #10:

| | | |
|---|---|---|
| 2,489.67 lbs. | ¾" crushed rock | |
| 188.00 lbs. | cement | |
| 75.20 lbs. | water | |
| 1.04 lbs. | foam | |
| 2.65 lbs. | flocculent | |
| 2,756.56 lbs. | Mix Weight Wet | |

Yield=1 cubic yard.
Water-to-cement ratio=0.40

Foam content: 20% by volume of the cement and water matrix, where the foam density=2.4 pcf.

Flocculent content: Represents the highest end of the range for this cement content and water-to-cement ratio.

Characteristics: Relatively low compressive strength (approx. 350 to 400 psi at 28 days); relatively high permeability (approx. 100 to 150 gpm/ft$^2$); a stiff material with a high angle of repose; durable and weather resistant when cured; high resistance to fast drying.

Example application: As a permeable, structurally supportive backing to a natural rock retaining wall or drop structure, where it is desired to place the material at a high angle of repose under high ambient temperatures.

Proportioning Mix Designs for the Invention:

The selection of each component in a mix design for the invention is dependent upon four basic factors: the intended application of the material; performance requirements in accordance with the application; economics associated with a project; and environmental conditions existing at the location of the application.

Aggregate: The aggregate portion of a mix design for this material is not calculated by typical concrete batching procedures, which generally involve solving the equation for determining the absolute volume of a given material. Normal concrete mixtures proportioned by the absolute volume method contain quantities of specifically graded large and fine aggregates, which when combined in a cement matrix are designed to occupy all available space in given unit volume. This is referred to as "zero air voids." The closer a mixture comes to achieving zero air voids, the more accurate the absolute volume calculation becomes for defining the true volume of the combined ingredients.

By contrast, this invention is specifically designed to create voids within a given volume of the material by eliminating the fine aggregate and using a more narrowly graded large aggregate. By design, the invention falls far short of achieving zero air voids, thereby invalidating the absolute volume method for proportioning mixtures for field application.

Instead, the aggregate proportioning problem is solved by using ASTM (American Society for Testing and Materials) testing procedure C 29, Standard Testing Method for Unit Weight and Voids in Aggregate. Using this procedure, a sample of aggregate is dried in an oven to remove moisture and bring it to a constant weight. A measuring vessel of known weight and volume then is filled with the aggregate material in three equal lifts. Each lift is rodded or jiggled to compact it in the vessel according to specified procedure and using specific tools. The surface of the aggregate then is leveled, with the top of the measuring vessel as a straightedge, or by hand. The vessel and its contents then are weighed, and the unit weight of the aggregate is determined by the following formula:

$$M=(G-T)/V$$

where:

M=unit weight of the aggregate, lb/ft$^3$.

G=weight of the aggregate plus the vessel, lb.

T=weight of the vessel, lb.

V=volume of the measure, ft$^3$.

Proportioning the quantity in lbs. of a given aggregate in a cubic yard of material is performed by multiplying the unit weight of the aggregate (M) expressed in lb/ft$^3$, by 27 ft$^3$, the number of cubic feet in a cubic yard. For example, if the unit weight of ¾ inch crushed rock is 92.21 lb/ft$^3$, the quantity of this aggregate required to produce a cubic yard of the invention is 92.21×27=2,489.67 lbs.

The remainder of the ingredients, cement, water, pre-generated foam, and flocculent that comprise the invention, when added to the aggregate do not increase the volume of the mixture. Instead, the remaining components occupy some of the void space between the aggregate particles.

Cement: The content of cement or other cementitious components in the mix design is primarily driven by striking a balance between performance requirements and economics, as with any other cementitious construction material. In terms of performance, the addition of more cement causes an overall increase in the strength of the material after it is cured. At the same time, an increase in cement content causes a corresponding increase in the cost of the product. This balance between strength and cost must be considered on a case by case basis.

The substitution of fly ash, kiln dust, or other pozzolanic material, for a portion of the cement in a mixture, is a consideration for reducing the cost of a mix, and is based on local availability. Substitution of cement with another material will affect performance, and testing of a specific mixture should be conducted to assess the change in performance vs. cost.

Another performance characteristic affected by the cement content is the permeability of the product in place. The effect of cement content on performance characteristics is illustrated in the comparison of Examples #3 and #4. The example mix designs each use ¾ inch crushed rock as the aggregate. Cement content is varied from the low end of the range, about 1.5 sacks or 141 lb., to the high end of the range, about 7 sacks or 658 lb. Foam content is held constant at 10% by volume of the cement/water matrix. The examples show the significant increase in strength with the increase in cement, and the corresponding decrease in permeability with increased cement.

Water: Water content in a mix is based primarily on two factors: cement or cementitious component content and aggregate size. More cement requires a corresponding increase in actual water content, in order to ensure complete hydration of the cement. The minimum basic water requirement for cement hydration is expressed by the water-to-cement ratio (w/c) and typically is about 0.25.

Additional water is required, beyond that necessary to hydrate the cement, for the purpose of wetting the aggregate surfaces. Aggregate size also influences the amount of additional water required in the mix. Smaller aggregate requires more water to achieve complete wetting of the available surface area. By contrast, larger aggregate has relatively less surface area, requiring less water for wetting.

Water content can be varied within the stated water-to-cement ratio ranges in order to effect desired changes in mix characteristics, as illustrated in Examples #5 and #6. In general, mix design water-to-cement ratios for larger aggregate will fall in the lower end of the range shown in the examples, while smaller aggregate will fall in the higher end of the range. The water and cement or cementitious components together establish a cement-and-water matrix, or a cementitious-component-and-water matrix, as the case may be, whose volume is determinable as explained below.

Foam: The amount of pregenerated foam added to a mix design varies between about 5% and about 30% of the volume of the cement-and-water matrix. The cement/water matrix does not increase the volume of the mixture, but rather, it occupies the void spaces between the aggregate particles. Further, an increase in the volume of the cement/water matrix causes a corresponding reduction in the porosity of the product. The foam creates an air void system within the cement matrix that tends to prevent freeze/thaw degradation at the contact points between adjacent aggregate particles. The foam increases the volume of the cement/water matrix and also contributes to a reduction in porosity and strength of the product.

The foam content is calculated by first determining the absolute volume of the cement/water matrix. The absolute volume is computed from each component material's weight and specific gravity using the following formula, usually expressed in cubic feet.

$$\text{Absolute Volume} = \frac{\text{Weight of material}}{\text{Specific gravity of material} \times \text{unit weight of water}}$$

For example, the volume of a two sack mixture of cement and water at a 0.40 water-to-cement ratio is determined as follows:

$$\text{Cement Absolute Volume} = \frac{188 \text{ lbs}}{3.15 \times 62.4 \text{ lbs/ft}^3} = 0.96 \text{ ft}^3$$

$$\text{Water Absolute Volume} = \frac{75.2 \text{ lbs}}{1.00 \times 62.4 \text{ lbs/ft}^3} = 1.21 \text{ ft}^3$$

Cement/Water Matrix Absolute Volume = 2.17 ft$^3$

The foam content for a mix design, expressed as a percentage of the cement/water matrix is determined based on performance criteria and subsequent laboratory testing. The foam quantity then is calculated as follows, for a 20% foam content, where the foam density=2.4 pcf, and the cement/water matrix occupies a volume of 2.17 ft$^3$:

Foam Content = 2.17 ft$^3$ × 0.20 = 0.43 ft$^3$ 0.43 ft$^3$ × 2.4 pcf = 1.03 lbs Foam Flocculent: In part, flocculent content is based on the cement content and water-to-cement ratio of the mixture. To some extent, the amount of flocculent also is based on performance requirements and environmental conditions.

The graph appearing as FIG. 1 shows four lines representing flocculent quantity at the extreme ends of the ranges for cement content and water-to-cement ratios for the invention. For cement ranging between 141 lbs/cubic yard and 658 lbs/cubic yard, the four lines graphically illustrate the boundaries for flocculent quantity as follows:

Line 1: The least flocculent at the lowest water-to-cement ratio of 0.30;

Flocculent @ 141 lbs cement=54 grams

Flocculent @ 658 lbs cement=780 grams

Slope of Line=1.40 grams Flocculent/lb Cement

Line 2: The most flocculent at the lowest water-to-cement ratio of 0.30;

Flocculent @ 141 lbs cement=498 grams

Flocculent @ 658 lbs cement=1620 grams

Slope of Line=2.13 grams Flocculent/lb Cement

Line 3: The least flocculent at the highest water-to-cement ratio of 0.55;

Flocculent @ 141 lbs cement=516 grams

Flocculent @ 658 lbs cement=1436 grams

Slope of Line=1.78 grams Flocculent/lb Cement

Line 4: The most flocculent at the highest water-to-cement ratio of 0.55;

Flocculent @ 141 lbs cement=2071 grams

Flocculent @ 658 lbs cement=2394 grams

Slope of Line=0.62 grams Flocculent/lb Cement

Calculation of intermediate flocculent quantities for cement contents between 141 lbs and 658 lbs, and for other water-to-cement ratios between 0.30 and 0.55 can be interpolated from the graph. For example, in the mix designs of Examples #1 and #2, the mid-range flocculent quantity for a mix design containing 376 lbs of cement and with a 0.47 water-to-cement ratio was calculated through interpolation from the graph of FIG. 1, as shown in the following chart.

| CHART 1: INTERPOLATION OF FLOCCULENT QUANTITY | |
|---|---|
| Flocculent at Intermediate Cement Content: | |
| Least Flocculent @ 0.30 w/c: 376 − 141 = 235. | 235 × 100 + 54 = 384 grams |
| Least Flocculent @ 0.55 w/c: | 235 × 1.78 + 516 = 934 grams |
| Difference: | = 550 grams |
| Most Flocculent @ 0.30 w/c: | 235 × 2.13 + 498 = 999 grams |
| Most Flocculent @ 0.55 w/c: | 235 × 0.62 + 2017 = 2218 grams |
| Difference: | = 1219 grams |
| New Water-to-Cement Ratio Interpolation: | 0.55 − 0.30 = 0.25 = 25 points |
| | 47 − 0.30 = 0.17 = 17 points |
| | 550/25 = 22 |
| | 1219/25 = 48.76 |
| Flocculent at New Water-to-Cement Ratio and Cement Content: | |
| Least Flocculent @ 0.47 w/c: | 384 + 22 × 17 = 758 grams |
| Most Flocculent @ 0.47 w/c: | 999 + 48.76 × 17 = 1828 grams |
| Mid-range Flocculent @ 0.47 w/c: | |
| (1828 grams − 758 grams)/2 + 758 grams | = 1293 grams |
| 1293 grams/453.6 grams/lb. | = 2.85 lbs. flocculent/cubic yard |

The comparative characteristics of several mix designs are shown in the following tables. Six different mix designs were tested, having variations in cement and aggregate content.

TABLE 1

SIX MIX DESIGNS

| Mix Number | Aggregate Type | Amount (lbs) | Cement (lbs) | W/C Ratio |
|---|---|---|---|---|
| 1 | 1/16" × 1/4" | 2681 | 188 | .50 |
| 2 | 1/16" × 1/4" | 2681 | 658 | .47 |
| 3 | 3/4" crushed | 2490 | 188 | .38 |
| 4 | 3/4" crushed | 2490 | 658 | .38 |
| 5 | 1 3/4" crushed | 2522 | 188 | .35 |
| 6 | 1 3/4" crushed | 2522 | 658 | .35 |

Notes: (1) Foam content is 10% by volume of the cement matrix in all cases.

(2) Mix design volumes per cubic yard are calculated from the dry-rodded unit weight of the aggregate:

1/16"×1/4"=99.3 pcf

3/4" crushed monzonite=92.2 pcf 1 3/4" crushed monzonite=93.4 pcf

TABLE 2

COMPRESSIVE STRENGTHS OF MIXES 1-6

| Mix Number | Aggregate Type/Cement per yd³ | 7 Day (psi) | 28 Day Ave. (psi) |
|---|---|---|---|
| 1 | 1/16" × 1/4"/188 lbs | 495 | 698 |
| 2 | 1/16" × 1/4"/658 lbs | 1609 | 2750 |
| 3 | 3/4" crushed/188 lbs | 410 | 423 |
| 4 | 3/4" crushed/658 lbs | 1397 | 1600 |
| 5 | 1 3/4" crushed/188 lbs | 389 | 424 |
| 6 | 1 3/4" crushed/658 lbs | 1485 | 1945 |

Note: 28 day strengths are the average of 2 breaks.

TABLE 3

PERMEABILITY OF MIXES 1-6

| Mix Number | Aggregate Type/Cement per yd³ | Flow Rate (Gal/Min/Ft²) |
|---|---|---|
| 1 | 1/16" × 1/4"/188 lbs | 30 |
| 2 | 1/16" × 1/4"/658 lbs | Impermeable |
| 3 | 3/4" crushed/188 lbs | 148 |
| 4 | 3/4" crushed/658 lbs | 55 |
| 5 | 1 3/4" crushed/188 lbs | 248 |
| 6 | 1 3/4" crushed/658 lbs | 139 |

Notes: 1. All samples tested were 6 inch diameter by 6 inches high.

2. All samples tested were molded from the same batch as the corresponding compressive strength samples.

3. Foam content of each sample is 10% by volume of the cement matrix.

4. Testing apparatus consisted of a 30 gallon drum with a hole cut in the bottom, through which a 6"×12" plastic cylinder mold extended. The samples were sealed into the end of the cylinder mold. The cylinder mold was sealed to the bottom of the drum using vaseline. No leaks were detected in any of the trials.

5. Each trial used 10 measured gallons of water.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

We claim:

1. A permeable cellular concrete product suited, upon setting, to form a cellular drainage structure, wherein on a volumetric basis the product comprises a mixture of:

aggregate material of substantially uniform grade in the size range from 1/16 inch to two inches, in a quanity corresponding to the volume of the product;

a cementitious component in the quantity range from 141 to 658 pounds per cubic yard of product;

water in quantity sufficient to create a water-to-cement ratio in the range from 0.30 to 0.55 and sufficient to wet said aggregate, establishing a cementitious-component-and-water matrix of known volume;

pre-formed surfactant foam having a foam density in the range from 2.0 to 3.0 pcf and in a quantity range of from 5% to 30% of said known volume of the cementitious-component-and-water matrix; and aqueous flocculent solution in a quantity of from 54 to 2,394 grams per cubic yard of product.

2. The product of claim 1, wherein said cementitious component comprises portland cement and a material selected from the group consisting of class C fly ash, kiln dust, and mixtures thereof.

3. The product of claim 1, wherein said cementitious component is a pozzolanic material.

4. The product of claim 1, wherein said pre-formed surfactant foam is generated from an aqueous solution of surfactant having a dilution rate in the range from 3 to 40 grams per liter of water.

5. The product of claim 4, wherein said pre-formed surfactant foam is generated from an aqueous solution of surfactant having a dilution rate in the range from 3 to 25 grams per liter of water.

6. The product of claim 1, wherein said flocculent solution is formed at a dilution rate in the range from 1 to 30 grams per liter of flocculent in water.

7. The product of claims 6, wherein said flocculent has a molecular weight of about 9,000,000.

8. The product of claim 1, wherein said flocculent solution is formed at a dilution rate in the range from 30 to 50 grams per liter of flocculent in water.

9. The product of claim 1, wherein said flocculent solution is in quantity sufficient to stiffen the mixture without flocculating said matrix sufficiently to expose surfaces of the aggregate.

10. The method of forming a water permeable, cellular drainage structure, comprising:

providing a volume of a settable product by preparing a first mixture containing:

a uniformly graded aggregate ranging in size from 1/16 inch to two inches in quantity corresponding to said volume of product;

a cementitious component in the quantity range from 141 to 658 pounds per cubic yard of product;

water in a water-to-cement ratio of 0.30 to 0.55 and in quantity sufficient to disperse the cementitious component and to achieve a smooth coating of the aggregate, establishing a cementitious-component-and-water matrix of known volume;

a pre-formed surfactant foam having a density in the range from 2.0 to 3.0 pounds per cubic foot and in the quantity range from 5% to 30% of said known volume of the cementitious-component-and-water matrix, and an aqueous flocculent solution in the quantity range from 54 to 2,394 grams per cubic yard of product; and placing the product in location to set, forming a water permeable, cellular drainage structure.

11. The method of claim 10, wherein said cementitious component comprises portland cement and a material selected from the group consisting of class C fly ash, kiln dust, and mixtures thereof.

12. The method of claim 10, wherein said cementitious component is a pozzolanic material.

13. The method of claim 10, wherein said pre-formed suifactant foam is generated from an aqueous solution of surfactant having a dilution rate in the range from 3 to 40 grams per liter of water.

14. The method of claim 13, wherein said pre-formed surfactant foam is generated from an aqueous solution of surfactant having a dilution rate in the range from 3 to 25 grams per liter of water.

15. The method of claim 10, wherein said flocculent solution is formed at a dilution rate in the range from 1 to 30 grams per liter of flocculent in water.

16. The method of claim 15, wherein said flocculent has a molecular weight of about 9,000,000.

17. The method of claim 10, wherein said flocculent solution is formed at a dilution rate in the range from 30 to 50 grams per liter of flocculent in water.

18. The product of claim 10, wherein said flocculent solution is in quantity sufficient to stiffen the mixture without flocculating said matrix sufficiently to expose surfaces of the aggregate.

* * * * *